Patented Oct. 27, 1953

2,657,208

UNITED STATES PATENT OFFICE 2,657,208

PROCESS FOR PREPARING 1-METHYL-4-PHENYL-4-CYANOPIPERIDINE

Frederick F. Blicke, Ann Arbor, Mich., assignor to Regents of The University of Michigan, Ann Arbor, Mich., a corporation of Michigan No Drawing. Application December 3, 1951, Serial No. 259,715

3 Claims. (Cl. 260—293)

This invention relates to a process for preparing 1-methyl-4-phenyl-4-cyanopiperidine which comprises heating an acid-addition salt of bis-(beta - dimethylaminoethyl) phenylacetonitrile and isolating the 1-methyl-4-phenyl-4-cyanopiperidine thus produced. The product is useful as an intermediate in the synthesis of the strong analgesic, meperidine.

The chemical reaction in this new process may be represented by the following equation; the monohydrochloride of the starting material is shown as exemplary:

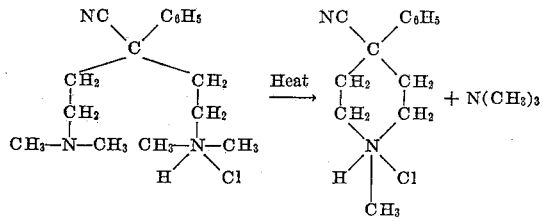

The new process is carried out by heating, preferably above its melting point and between about 200° C. and 350° C., an acid-addition salt of bis - (beta - dimethylaminoethyl) phenylacetonitrile. The acid-addition salt can be a mono-salt or a di-salt depending upon whether one or both amino groups are neutralized. Similarly, mixtures of the free base and the di-salt can be employed; this mixture is essentially equivalent to the mono-salt. The reaction which occurs is a cyclization in which trimethylamine is split out. most of the trimethylamine escapes in the form of a gas, although some can remain behind in the form of its acid-addition salt, particularly when the di-salt of the starting bis(beta-dimethylaminoethyl)phenylacetonitrile is used. The residue remaining after the heating operation consists largely of an acid-addition salt of the desired 1-methyl-4-phenyl-4-cyanopiperidine. This can be purified by conventional means, as by isolation and recrystallization of the acid-addition salt, or by conversion of the acid-addition salt to the free base by addition of alkali, followed by distillation.

The bis(beta - dimethylaminoethyl)phenylacetonitrile used as the starting material in the new process is prepared by alkylation of diphenylacetonitrile with a dimethylaminoethyl halide in the presence of a basic condensing agent such as sodium amide by the method described in Lucas U. S. Patent 2,510,784. This is exemplified by the following equation in which X is halogen:

C₆H₅CH₂CN + 2(CH₃)₂NCH₂CH₂X + 2NaNH₂ ⟶

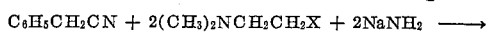
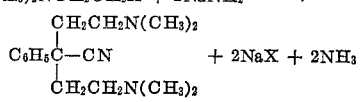

The following examples illustrate my invention but are not to be construed as limitative.

EXAMPLE 1

(a) *Bis(beta-dimethylaminoethyl)phenylacetonitrile mono- and dihydrochloride*

A solution of 58.7 g. (0.50 mole) of phenylacetonitrile in 50 cc. of benzene was added, dropwise, to a stirred suspension of 43.0 g. (1.1 moles) of pulverized sodium amide in 150 cc. of benzene at 0° C. The mixture was cooled and stirred for one hour, and beta-dimethylaminoethyl chloride (obtained from 158.4 g. (1.1 moles) of beta-dimethylaminoethyl chloride hydrochloride), dissolved in 150 cc. of benzene, was added in portions while the temperature was maintained below 40° C. The mixture was then refluxed for three hours, cooled, diluted with 200 cc. of water, the organic layer separated and the aqueous layer extracted with benzene. The solvent was removed from the combined benzene solutions, and the residue was distilled giving 115 g. (89%) of bis(beta-dimethylamino)phenylacetonitrile, B. P. 130–135° C. (1–2 mm.).

Anal.: Calcd. for $C_{16}H_{25}N_3$: N, 16.20. Found: N, 16.05.

The monohydrochloride was obtained when 129.3 g. (0.50 mole) of the base, 250 cc. of water and 90.0 g. of constant boiling hydrochloric acid were mixed and the solution concentrated under reduced pressure. The solid residue of the monohydrochloride, M. P. 242–243° C. (dec.) was dried at 100° C. and used without further purification.

The dihydrochloride was obtained by dissolving a sample of the free base in warm absolute alcohol, cooling the solution and treating it with a slight excess of alcoholic hydrogen chloride. The gelatinous precipitate was washed thoroughly with alcohol and then dried in an oven to give the dihydrochloride, M. P. 273° C. (dec.).

Anal.: Calcd. for $C_{16}H_{27}Cl_2N_3$: Cl, 21.34; N, 12.65. Found: Cl, 20.53; N, 12.35.

(b) *methyl-4-phenyl-4-cyanopiperidine*

The monohydrochloride of bis(beta-dimethylaminoethyl)phenylacetonitrile (29.6 g.) was placed in a 300 cc. flask to which an air condenser was attached and heated in a metal bath to 290° C. As soon as the salt melted, trimethylamine was evolved. The bath temperature was maintained at 270–290° C. After six minutes the salt had melted completely, and after ten minutes the evolution of gas had practically stopped. When cooled, the light brown glassy residue was dissolved in a warm mixture of 20 cc. of water and 5 cc. of concentrated hydrochloric acid.

The aqueous acid solutions obtained from three such experiments were combined, and the solution was treated with concentrated sodium hydroxide solution. The liberated free base was extracted with ether, dried over anhydrous magnesium sulfate and distilled, giving 47.1 g. (78.5%) of 1-methyl-4-cyanopiperidine, B. P. 119–122° C. (1–2 mm.). The distillate solidified completely and had the M. P. 53° C.

A portion of the basic nitrile was converted into its hydrochloride, which had the M. P. 222–224° C. after recrystallization from absolute ethanol. A mixed melting point with a sample of the same substance prepared by a different method showed no depression. The picrate of the 1-methyl-4-phenyl-4-cyanopiperidine after recrystallization from methanol melted at 247° C.

In one experiment the evolved trimethylamine was passed into methyl bromide dissolved in chloroform. The precipitated tetramethylammonium bromide represented 77% of the calculated amount. The actual quantity of trimethylamine evolved was greater than the amount indicated since some of the gas escaped from the trap. Since the melting point of the quaternary salt is not definite, the identity of the quaternary compound was established by the analysis of ionizable bromine.

Instead of the monohydrochloride of bis-(beta - dimethylaminoethyl) phenylacetonitrile, the monohydrobromide or monohydriodide can be used in this reaction.

EXAMPLE 2

*Preparation of 1-methyl-4-phenyl-4-cyanopiperidine from bis(beta-dimethylaminoethyl)-phenylacetonitrile and its dihydrochloride.*—A mixture of 13.0 g. (0.05 mole) of bis(beta-dimethylaminoethyl)phenylacetonitrile and 16.5 g. (0.05 mole) of its dihydrochloride was heated in a metal bath at 260–280° C. for ten minutes, and then at 280–310° C. for another ten minutes. The reaction mixture was then worked up according to the method described in Example 1, Part (b), giving 14.2 g. (71%) of 1-methyl-4-phenyl-4-cyanopiperidine, M. P. 53° C.

EXAMPLE 3

*Preparation of 1-methyl-4-phenyl-4-cyanopiperidine from bis(beta-dimethylaminoethyl)-phenylacetonitrile dihydrochloride.*—The dihydrochloride of bis(beta-dimethylaminoethyl)-phenylacetonitrile (22.5 g.) was heated at 210–325° C. for ten minutes. The reaction product was worked up according to the method described in Example 1, Part (b), giving 7.5 g. (55%) of 1-methyl-4-phenyl-4-cyanopiperidine, B. P. 116–121° C. (1–2 mm.). This was converted into its hydrochloride, M. P. 222–224° C.

I claim:

1. The process for preparing 1-methyl-4-phenyl-4-cyanopiperidine having the formula

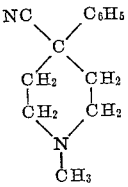

which comprises heating between about 200° C. and 350° C. and acid-addition salt of bis(beta-dimethylaminoethyl) phenylacetonitrile having the formula

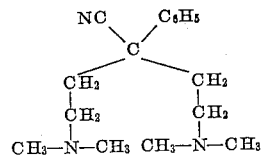

and isolating the 1-methyl-4-phenyl-4-cyanopiperidine thus produced.

2. The process for preparing 1-methyl-4-phenyl-4-cyanopiperidine having the formula

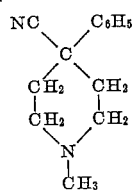

which comprises heating between about 200° C. and 350° C. the monohydrochloride of bis(beta-dimethylaminoethyl) phenylacetonitrile having the formula

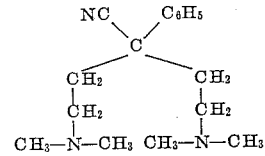

and isolating the 1-methyl-4-phenyl-4-cyanopiperidine thus produced.

3. The process for preparing 1-methyl-4-phenyl-4-cyanopiperidine having the formula

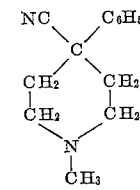

which comprises heating between about 200° C. and 350° C. the dihydrochloride of bis(beta-dimethylaminoethyl) phenylacetonitrile having the formula

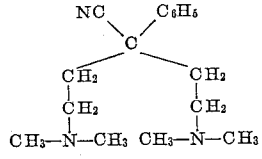

and isolating the 1-methyl-4-phenyl-4-cyanopiperidine thus produced.

FREDERICK F. BLICKE.

References Cited in the file of this patent

UNITED STATES PATENTS

| Number | Name | Date |
| --- | --- | --- |
| 2,418,289 | Bergel et al. | Apr. 1, 1947 |
| 2,486,792 | Miescher et al. | Nov. 1, 1949 |
| 2,486,793 | Miescher et al. | Nov. 1, 1949 |
| 2,486,794 | Miescher et al. | Nov. 1, 1949 |
| 2,486,796 | Miescher et al. | Nov. 1, 1949 |

FOREIGN PATENTS

| Number | Country | Date |
| --- | --- | --- |
| 127,779 | Switzerland | May 9, 1927 |